United States Patent [19]

Schwake

[11] 4,425,096
[45] Jan. 10, 1984

[54] TEACHING TOOL WITH RF SWITCHING

[76] Inventor: William O. Schwake, 1133 W. First, Sulphur, Okla. 73086

[21] Appl. No.: 422,760

[22] Filed: Sep. 24, 1982

[51] Int. Cl.³ .......................... G09B 23/02; G09B 7/00
[52] U.S. Cl. ...................................... 434/201; 434/322
[58] Field of Search ............... 434/189, 191, 201, 118, 434/224, 322, 326–329, 331, 335, 340, 341, 344, 362

[56] References Cited

U.S. PATENT DOCUMENTS

| | | |
|---|---|---|
| 3,382,588 | 5/1968 | Serrell . |
| 3,477,143 | 11/1969 | Aumann . |
| 3,516,176 | 6/1970 | Cleary . |
| 3,579,857 | 5/1971 | Lamberson . |
| 3,654,706 | 4/1972 | Perella ................................ 434/340 |
| 3,696,525 | 10/1972 | Cleary . |
| 3,699,668 | 10/1972 | Tesar . |
| 3,704,337 | 11/1972 | Sims . |
| 3,729,838 | 5/1973 | Adcock . |
| 3,757,322 | 9/1973 | Barkan . |
| 3,763,574 | 10/1973 | Rose . |
| 3,795,989 | 3/1974 | Greenberg . |
| 3,800,437 | 4/1974 | Lamberson . |
| 3,818,610 | 6/1974 | Baba . |
| 3,864,848 | 2/1975 | Smith . |
| 3,881,260 | 5/1975 | Hombs ................................ 434/118 |
| 3,937,565 | 2/1976 | Alasia ................................ 434/322 |
| 3,955,290 | 5/1976 | Filer . |
| 3,975,836 | 8/1976 | Broder ................................ 434/118 |
| 4,073,068 | 2/1978 | Albenda . |
| 4,259,077 | 3/1981 | Keweza ................................ 434/118 |

*Primary Examiner*—Vance Y. Hum
*Attorney, Agent, or Firm*—Bill D. McCarthy

[57] ABSTRACT

Externally placed cards with covert embedments trigger, by radio frequency energy variables, electronic switching systems within a decoder box. Indicia displayed on differing cards present clues which, if properly interpreted and acted upon, result in positive motivational awards. If improper actions result negative motivational effects can be displayed or, by selection, the negative motivational display can be blanked out.

6 Claims, 8 Drawing Figures

TEACHING TOOL WITH RF SWITCHING

BACKGROUND OF THE INVENTION

Teaching tools have existed since educational efforts were first organized and vary from the crude to the exotic. As the exotic levels are approached a transition begins from the teaching tool area into the area of educational devices.

The first teaching tool may have been a stick for scratching marks on the ground. In certain circumstances sticks are still used as effective teaching tools.

Current technology provides some educational devices that are very objective and highly sophisticated. Such equipment basically seeks to eliminate humanistic variations from the teaching process.

Generally speaking it can be assumed that educational devices are configured for standard presentations in a nonvariable manner. Teaching tools, on the other hand, can be asummed to be readily variable and configured to present subjective material in accordance with teacher perceived student needs. The transitional zone between teaching tools and educational devices is relatively broad. Within such transitional zone can be found mechanisms such as represented by the following listed U.S. patents.

| Number | Date of Issue | Inventor | Title |
| --- | --- | --- | --- |
| 3,382,588 | May 14, 1968 | R. Serrell | Response Expression Apparatus for Teaching Machine |
| 3,516,176 | June 23, 1970 | A. Cleary | Touch Detecting Teaching Machine |
| 3,477,143 | Nov. 11, 1969 | Aumann | Electrical Teaching Machine |
| 3,579,857 | May 25, 1971 | Lamberson | Electric Teaching Device |
| 3,699,668 | Oct. 24, 1972 | Tesar | Instruction Device With Interchangeable Indicia Cards |
| 3,704,337 | Nov. 28, 1972 | Sims | Tactile Response Teaching System |
| 3,696,525 | Oct. 10, 1972 | Cleary | Touch Detecting Teaching Machine |
| 3,729,838 | May 1, 1973 | Adcock | Educational and Recreational Device |
| 3,757,322 | Sept 4, 1973 | Barkan | Transparent Touch Controlled Interface with Interreactively Related Display |
| 3,763,574 | Oct. 9, 1973 | Rose | Educational Apparatus |
| 3,795,989 | Mar. 12, 1974 | Greenburg | Education Apparatus |
| 3,800,437 | Apr. 2, 1974 | Lamberson | Educational Apparatus |
| 3,818,610 | June 25, 1974 | Baba | Study Aid |
| 3,864,848 | Feb. 11, 1975 | Smith | Learner Feedback Device |
| 3,955,290 | May 11, 1976 | Filer | Learning Devices |
| 4,073,068 | Feb. 14, 1978 | Albenda | Teaching Light |

It is to be noted that these inventions are considered to be descriptive of the background of the instant invention but are not deemed to be prior art. The listed patents are considered to be within the transitional area between teaching tools and educational devices and the instant invention is considered as being outside of the transitional area and within the field of teaching tools.

The background of the invention introduces the utilization of electrical and electronic technology into learning situations and exemplifies the patentable distinctions found to exist between each to all others and, by implication, defines that which is not obvious in consideration of other inventions when viewed in isolation or conjunction.

SUMMARY OF THE INVENTION

An object of the invention is to provide a teaching tool for increasing teaching efficiencies and effectiveness without an imposition of demands for higher teaching skills or any substantial alteration of established routine practices.

Another object of the invention is to provide cost effective learning evaluations which are not necessarily dependent upon language communication skills.

Another object of the invention is to provide a teaching tool of operational simplicity and flexibility on the order of pencil and paper functionality.

Another object of the invention is to provide a teaching tool devoid of moving parts in its operational cycle so the validity of the evaluation process is not derogated by malfunction potentials.

Another object of the invention is to extend the working life of the teaching tool by the use of readily replaceable evaluation presentation means so that normal wear and tear is continuously offset by discarding old evaluation presentation means as new evaluation presentation means are routinely introduced into the operation.

Another object of the invention is to provide optimum internal battery life by minimizing electrical power needs during evaluation operations.

Other objects of the invention will be apparent from the drawings, description and claims.

DESCRIPTION OF THE PREFERRED EMBODIMENT

The teaching tool 10 utilizes a redundancy of electronic circuits known within the art as Colpitts Oscillator circuits, which are modified in a manner later detailed herein, to provide actuation power for electronic switching without dependence on mechanically moving parts. The operational sequence is dependent upon radio wave emanations, hereafter referenced as rf, which are either absorbed or not absorbed and thus produce either a digital logic electronic HIGH or LOW signal.

Many substances of diverse nature have the property of absorbing rf energy and the particular type of substance used is immaterial to the invention.

Figure 1:
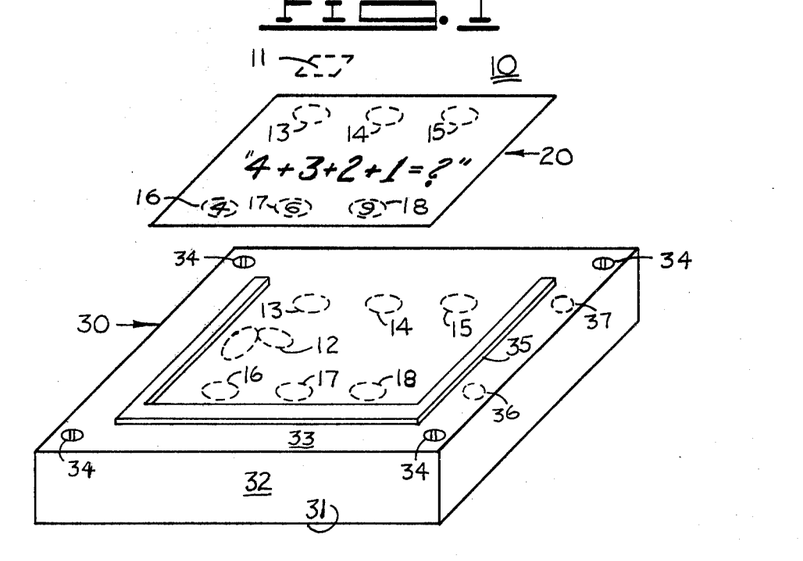
FIG. 1 is a perspective view of the teaching tool as seen externally.

In FIG. 1 phantom lines depict a first rf absorbing substance 11 and a second rf absorbing substance 12. In the preferred embodiment the first rf absorbing substance 11 consists of a gummed tape having metalized paint deposited on the non-gummed surface. Such tapes are commonly used to identify, for instance, the contents of different tubing layouts in aircraft plumbing bays. Any substance of like capability can be used as the first rf absorbing substance 11. Although FIG. 1 phantom lines show the second rf absorbing substance 12 in the shape of a human finger the actual substance used is immaterial to the invention.

In FIG. 1 phantom lines are shown on the surface of the covertly encoded card 20 to indicate a first rf window 13, a second rf window 14, a third rf window 15, a fourth rf window 16, a fifth rf window 17, and a sixth rf window 18. Such windows are also referenced in other figures by phantom lines and represent areas where the operational cycle may create penetrative localized rf energy.

The pencil and paper simplicity of the teaching tool 10 is suggested by the indicia marked on the surface of the card 20 as the notation: $4-3+2+1=?$, with the numeral four marked within the area of the fourth rf window 16, the numeral six marked within the area of the fifth rf window 17 and the numeral nine placed in the area of the sixth rf window 18. In this instance it is to be assumed that a first rf absorbing substance 11 has been covertly embedded in the card 20 within the boundaries of the first rf window 13.

In such instance, and in an operational situation where the encoded card 20 is placed atop the decoder box 30 and electrical power is appropriately provided and routed, placement of the second rf absorbing substance 12 within the boundaries of the fourth rf window 16 would create what will be later detailed herein as a second light illumination externally visible through the phantom line indicated second indicator window 37. Placement of the second rf absorbing substance 12 within the bondaries of either the fifth or sixth rf windows 17 or 18 would create what will be later detailed herein as a first light illumination visible through the phantom line indicated first indicator window 36.

Alternatively it can be seen that if the encoded card 20 had the first rf absorbing substance 11 covertly embedded within the boundaries of the second rf window 14, and if a part of the original notation was erased and amended to read $4+3-2+1$, the placement of the second rf absorbing substance 12 within the boundaries of the fifth rf window 17 would create a second light illumination behind the second indicator window 37. Placement of the second rf absorbing substance 12 within the boundaries of either the fourth or sixth rf windows 15 or 18 would create a first light illumination behind the first indicator window 36.

Alternatively it can be seen that if the encoded card 20 had the first rf absorbing substance 11 covertly embedded within the boundaries of the third rf window 15, and if a part of the original notation was erased and amended to read $4+3+2-1$, the placement of the second rf absorbing substance 12 within the boundaries of the sixth rf window 18 would create a second light illumination behind the second indicator window 37. Placement of the second rf absorbing substance 12 within the boundaries of either the fourth or fifth rf windows 16 or 17 would create a first light illumination behind the first indicator window 36.

Changing the notation, of course, has no functional effect other than revealing which rf window will produce a second light illumination when the second rf absorbing substance 12 is properly placed. When the first rf absorbing substance is covertly embedded in the card 20 only the indicia provides the clue as to where the second rf absorbing substance 12 should be placed.

The manner of covertly embedding the first rf absorbing substance 11 in the coded card 20 is immaterial to the spirit of the invention but in the preferred embodiment two pieces of relatively heavy paper are cut to size, the gummed tape with metalized paint on one side is then affixed in the desired area on one paper and concealment is achieved by glued coverage with the second paper. A multitude of cards 20 are provided having the first rf absorbing substance in various alternative positions. Although paper is used in the preferred embodiment any other substance transparent to radio waves could serve equally well.

As seen in FIG. 1 the decoder box 30 is comprised of a bottom portion 31 with an upwardly extensive encompassing side wall 32 providing a mating surface for a box top 33. Fastening means 34 secure the box top 33 in a manner which allows access to the component parts, as later described herein, mounted within the decoder box 30.

The box top 33 has a card positioning frame 35 that enables the encoded card 20 to achieve alignment coincidence of the first, second, third, fourth, fifth and sixth rf windows 13, 14, 15, 16, 17 and 18. The side wall 32 has a power switch orifice 38 and a light indicator switch orifice 39. The box bottom portion 31 provides means for mounting and protecting a power supply assembly 40, an encodement sensor assembly 50, a response sensor assembly 60, an interpretive assembly 70 and a light signal assembly 80.

Figure 2:
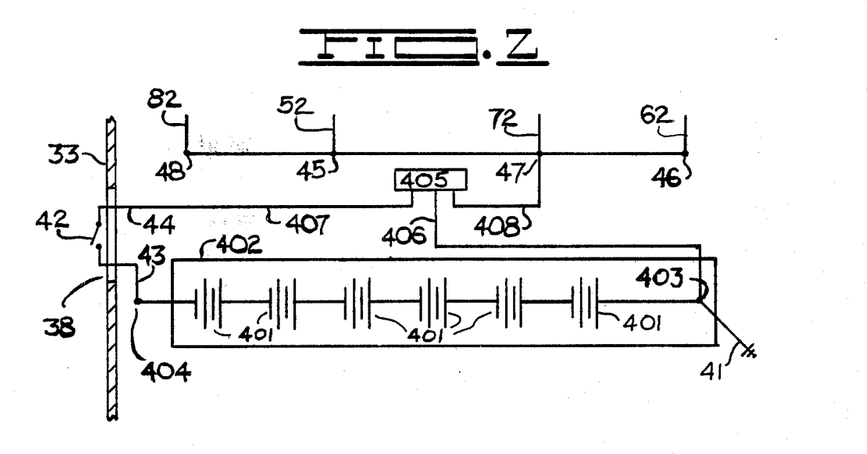
FIG. 2 is a schematic of the internal power supply provisions.

As seen in FIG. 2 the power supply assembly 40 has a ground lead 41 connecting to a common ground, not shown, on the bottom 31 of the box 30 and a power switch 42 that is penetratively positioned within the switch orifice 38 of the side wall 32. A plurality of storage batteries 401 are positioned within a conventional battery case 402 to provide a series type interconnection having a negative terminal 403 connecting with the ground lead 41. The power switch 42 has a first lead 43 connecting to the positive terminal 404 and a second terminal 44.

The preferred embodiment uses a voltage regulator 405 of the type common to a digital logic electronic circuits and normally referred to as a type 7805 chip. The voltage regulator 405 has a first lead 406 connecting to the negative terminal 403, a second lead connecting to the power switch second terminal 44 and a third lead 408 forming a bus with an encodement sensor terminal 45, a response sensor terminal 46, an interpretive terminal 47 and a light signal terminal 48.

Figure 3:
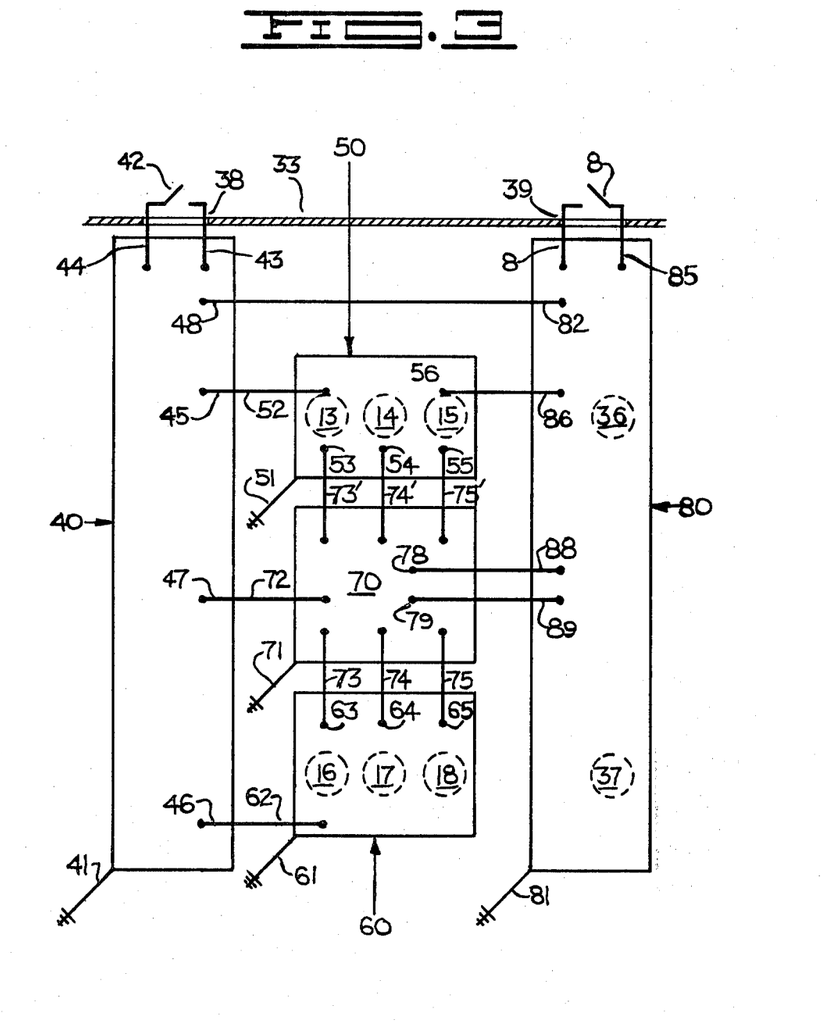
FIG. 3 is a block diagram of internal components and wiring.

As seen in FIG. 3 the power supply assembly 40 has a common ground terminal 41, a power control switch 42 having an uncontrolled voltage power input lead 43 and an uncontrolled voltage power output lead 44. It also has a controlled voltage encodement sensor power output terminal 45, a response sensor power output terminal 46, an interpretive power output terminal 47 and a light signal power output terminal 48.

The encodement sensor assembly 50 has a ground lead 51 connecting to the common ground terminal 41, a power input lead 52 connecting to the encodement sensor power output terminal 45, a first overt output terminal 53, a second covert power output terminal 54, a third covert power output terminal 55 and a confirmation power output terminal 56.

The response sensor assembly 60 has a ground lead 61 connecting to the common ground terminal 41, a power input lead 62 connecting to the response sensor power output terminal 46, a first overt power output terminal 63, a second overt power output terminal 64, and a third overt out terminal 65.

The interpretive assembly 70 has a ground lead 71 connecting to the common ground terminal 41, a power input lead 72 connecting to the interpretive power output terminal 47, a first overt power input lead 73 connecting with the first overt power output terminal 63, a second overt power input lead 74 connecting with the second overt power output terminal 64, a third overt power input lead 75 connecting with the third overt power output terminal 65, a first covert power input lead 73' connecting with the first covert power output terminal 53, a second covert power input lead 74' connecting with the second covert power output terminal 54, a third covert power input lead 75' connecting with the covert power output terminal 55, a first light signal power output terminal 78 and a second light signal power output lead 79.

The light signal assembly 80 has a ground lead 81 connecting to the common ground terminal 41, a power input lead 82 connecting to the light signal power output terminal 48 and a light control switch 83 that is penetratively positioned within the light switch orifice 39 of the decoder box side wall 32. The light switch 83 has a first lead 84 and a second lead 85. The light signal assembly 80 also has a confirmation power input lead 86 connecting to the confirmation output terminal 56, a first light signal power input lead 88 connecting to the first signal power output terminal 78 and a second light signal power input lead 89 connecting to the second light power output terminal 79.

Figure 4:
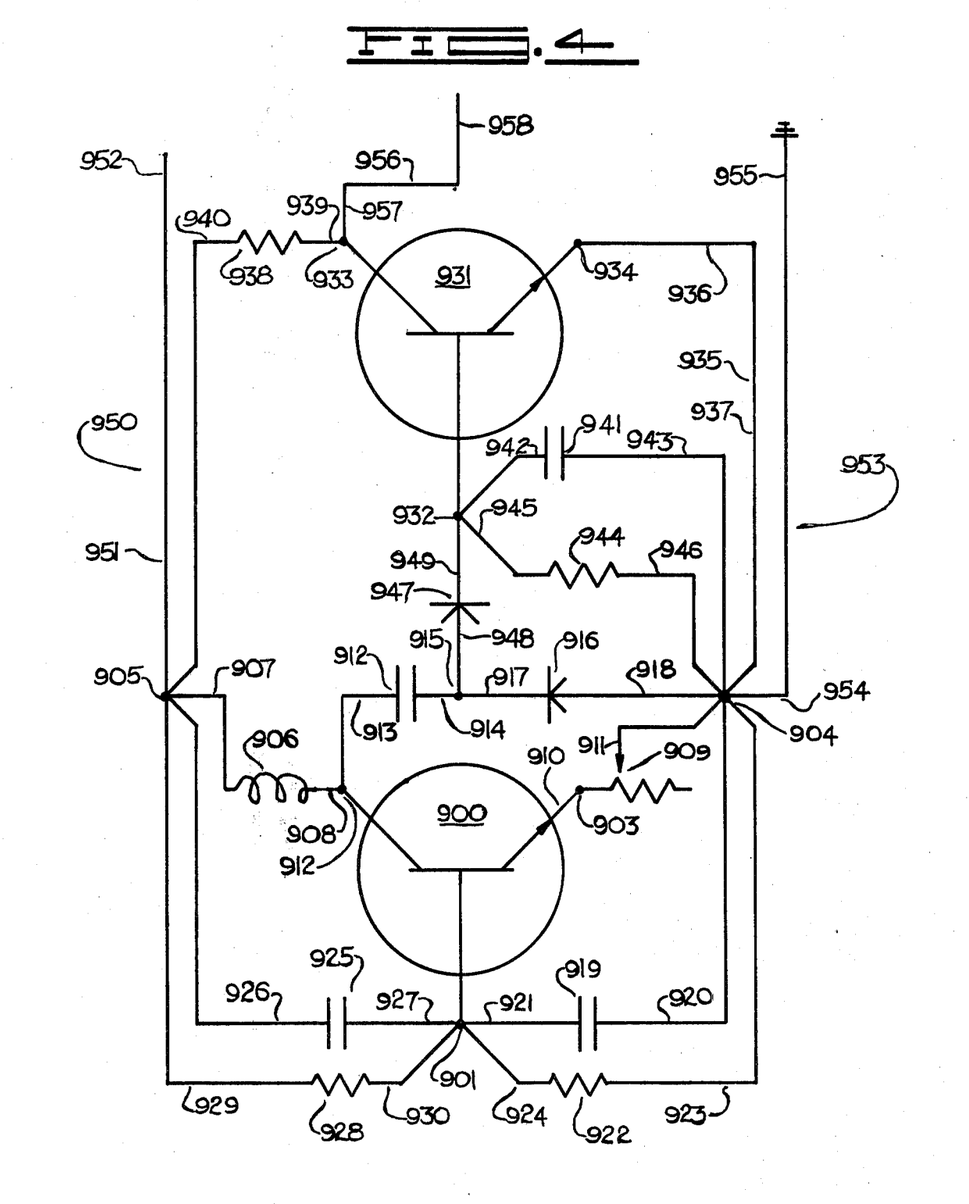
FIG. 4 is a schematic of the Colpitts Oscillator modification.

As seen in FIG. 4 the modified Colpitts Oscillation circuit 90 is configured as a digital logic electronic switching component that can be isolated from the ambient environment and remotely controlled from the external side of an rf window by the presence or absence of an rf absorbing substance. When an rf absorbing substance is present the modified Colpitts Oscillator circuit 90 delivers a digital logic HIGH signal, otherwise it delivers a digital logic LOW signal.

Colpitts Oscillator circuits are often taught by comparison with self priming water pumps. As long as some part of the pumped water in a self priming water pump is recirculated the developed water pressure is high, if the recirculation is denied the developed water pressure is low. In digital logic electronics signals are dependent upon voltage, the equivalent of water pressure, and when the flow of power is absorbed or bled off faster than the rate of generation the signal goes low. When the rate of generation is greater than the absorbtion or bleed off the signal goes high. The signal value is one of voltage and the voltage value is determined by input/output rates of flow.

As seen in FIG. 3 the electrical arrangement known as a Colpitts Oscillator circuit is modified in the preferred embodiment so that the presence or absence of rf energy in the feedback circuit establishes power suitable for digital logic electronic signals.

An oscillator transistor 900 has a base terminal 901, a collector terminal 902 and an emitter terminal 903. The circuit depends upon electrical power flow through a negative bus 904 and a positive bus 905.

A load inductor coil 906 has a first lead 907 connecting to the collector terminal 902 and a second lead 908 connecting to the positive bus 905. The actions and reactions within the circuit cause the load inductor coil 906 to generate radio waves that can be either absorbed as rf energy or fed back into the system to produce electrical energy.

A variable resistor 909 has a first lead 910 connecting to the emitter terminal 903 and a second lead 911 connecting to the negative bus 904.

A coupling capacitor 912 has a first lead 913 connecting to the collector terminal 902 and a second lead 914 extending to form a diode node 915.

A first rectifier diode 916 has a first lead 917 connecting to the diode node 915 and a second lead 918 connecting to the negative bus 904.

A first biasing capacitor 919 has a first lead 920 connecting to the negative bus 904 and a second lead 921 connecting to the base terminal 901.

A first biasing resistor 922 has a first lead 923 connecting to the negative bus 904 and a second lead 924 connecting to the base terminal 901.

A second biasing capacitor 925 has a first lead 926 connecting to the positive bus 905 and a second lead 930 connecting to the base terminal 901.

A second biasing resistor 928 has a first lead 929 connecting to the positive bus 905 and a second lead 930 connecting to the base terminal 901.

The major modification of the Colpitts Oscillator circuit in the preferred embodiment introduces a switching transistor 931 with a base terminal 932, a collector terminal 933 and an emitter terminal 934 so as to alter rf energy into a digital logic signal.

A switching jumper lead 935 has a first end 936 connecting to the emitter terminal 934 and a second end 937 connecting to the negative bus 904.

A load resistor 938 has a first lead 939 connecting to the collector terminal 933 and a second lead 940 connecting to the positive bus 905.

A time constant capacitor 941 has a first lead 942 connecting to the base terminal 932 and a second lead 943 connecting to the negative bus 904.

A time constant resistor 944 has a first lead 945 connecting to the negative bus 904 and a second lead 946 connecting to the base terminal 932.

A second rectifier diode 947 has a first lead 948 connecting to the diode node 915 and a second lead 949 connecting to the base terminal 932.

A power input lead 950 has a first end 951 connecting to the positive bus 905 and a second end 942 connecting to an appropriate power supply terminal.

A ground lead 953 has a first end 954 connecting to the negative bus 904 and a second end 955 connecting to an appropriate ground terminal.

A signal output lead 956 has a first end 957 connecting to the collector terminal 933 and a second end 958 connecting to an appropriate signal terminal.

Figure 5:
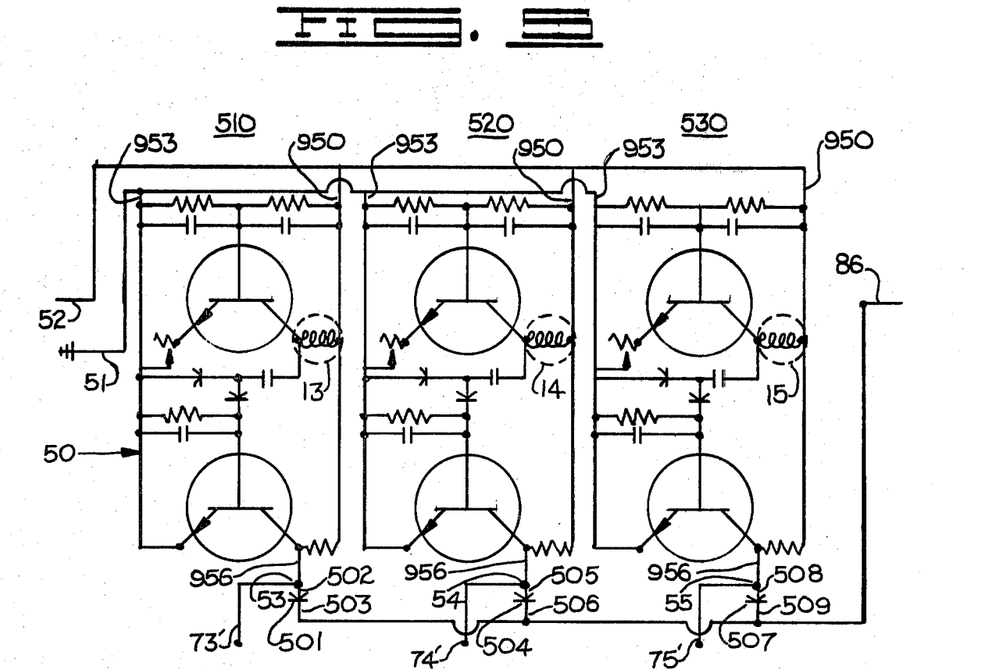
FIG. 5 is a schematic of the covert signal generator assembly.

As seen in FIG. 4 the encodement sensor assembly 50 of the preferred embodiment relies upon three modified Colpitts Oscillator circuits in the form of a first covert circuit 50 which associates with the first rf window 13, a second covert circuit 520 that associates with the second rf window 14 and a third covert circuit 530 that associates with the third rf window 15.

A grounding lead 51 associates with the negative busses 953 and a power input lead 52 associates with the positive busses 950.

First, second and third covert power output terminals 53, 54 and 55 provide power to the interpretive power input first, second and third input leads 73', 74' and 75'.

A first confirmation diode 501 has a first lead 502 connecting to the output terminal 53 and a second output lead 503 connecting to the confirmation lead 86. A second confirmation diode 504 has a first lead 505 connecting to the output terminal 54 and a second output lead 506 connecting to the confirmation lead 86. A third confirmation diode 507 has a first lead 508 connecting to the output terminal 55 and a second output lead connecting to the confirmation lead 86.

Figure 7:
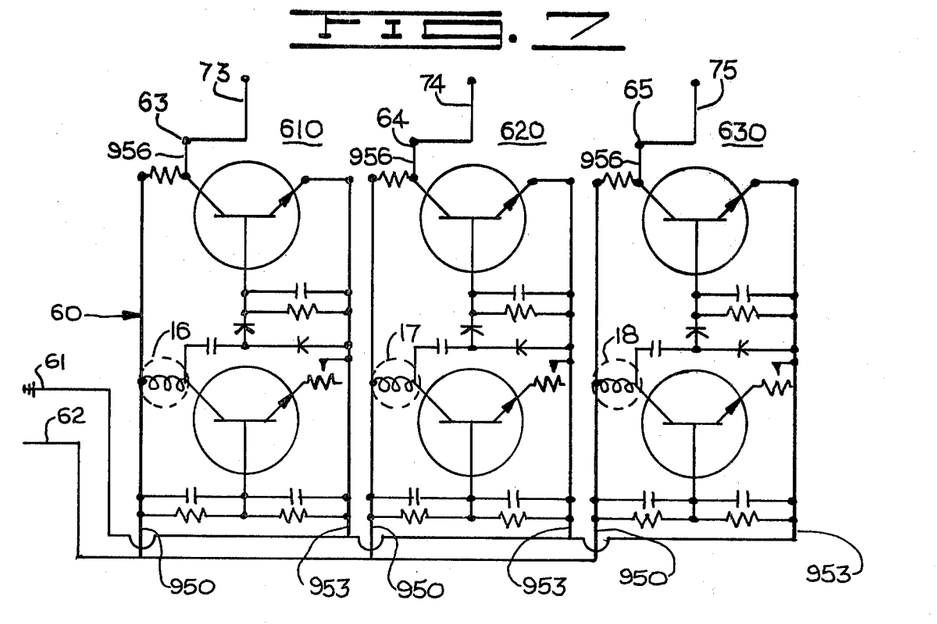
FIG. 7 is a schematic of the overt signal generator assembly.

As seen in FIG. 7 the response sensor assembly 60 of the preferred embodiment relies upon three modified Colpitts Oscillator circuits 90 in the form of a first overt circuit 610 which associates with the fourth rf window 16, a second overt circuit 620 that associates with the fifth rf window 17 and a third overt circuit that associates with the sixth rf window 18.

A ground lead 61 associates with the negative busses 953 and a power input lead 62 associates with the positive busses 950. First, second and third overt power output terminals 63, 64 and 65 provide power to the interpretive power input first, second and third input leads 73, 74 and 75.

Figure 6:
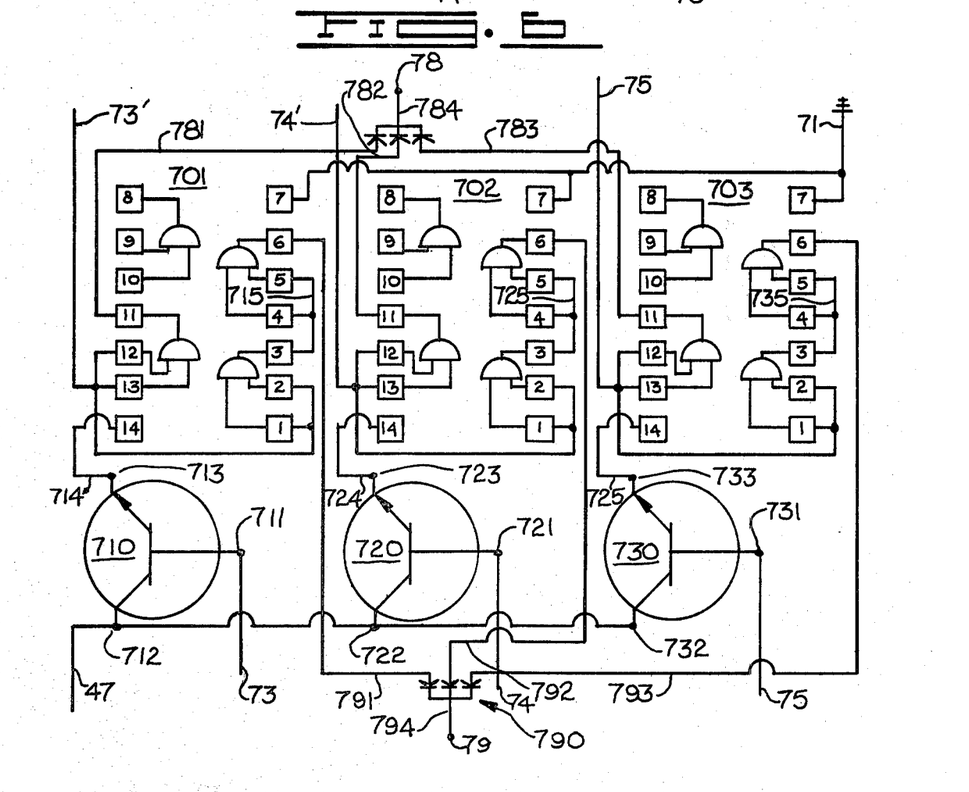
FIG. 6 is a schematic of the signal evaluation apparatus.

As seen in FIG. 6 the interpretive assembly 70 of the preferred embodiment relies upon conventional digital logic double input quad NAND gates normally known as type 7400 chips and have, in standard fashion, terminals numbered 1 through 14 with terminal 14 as a positive bus and terminal 7 as a negative bus. In the preferred embodiment the terminals 8, 9 and 10 are shown as not used and, for the sake of clarity, shown without attached leads but in actual practice terminals 9, 10 and 7 would be jumpered together to decrease operational power consumption.

The interpretive assembly 70 has a ground lead 71 connecting with the common ground 41 of the power supply assembly 40 and a power input lead 72 connecting with the interpretive power output terminal 47.

A first covert chip 701 is paired with a first overt transistor 710 having a base terminal 711, a collector terminal 712 and an emitter terminal 713.

A second covert chip 702 is paired with a second overt transistor 720 having a base terminal 721, a collector terminal 722 and an emitter terminal 723.

A third covert chip 703 is paired with a third overt transistor 730 having a base terminal 731, a collector terminal 732 and an emitter terminal 733.

The first overt transistor base terminal 711 is connected to the overt input lead 73, the second overt transistor base terminal 721 is connected to the overt input lead 74 and the third overt transistor base terminal 731 is connected to the overt input lead 75.

The first overt transistor collector terminal 712, the second collector terminal 722 and the third collector terminal 732 are connected to the positive bus 718 which also connects with the power input lead 72.

The first overt transistor emitter terminal 713 is connected to the terminal 14 of the first covert chip 701 by the first overt lead 714, the second emitter terminal 723 is connected to the terminal 14 of the second covert chip 702 by the second overt lead 724 and the third emitter terminal 733 is connected to the terminal 14 of the third covert chip 703 by the third overt lead 734.

A first diodic jumper 715 interconnects terminals 3, 4 and 5 of the first covert chip 701. A second diodic jumper 725 interconnects the terminals 3, 4 and 5 of the second covert chip 702. A third diodic jumper 735 interconnects the terminals 3, 4 and 5 of the third covert chip 703.

A first passive jumper 716 interconnects terminals 1, 2, 12 and 13 of the first covert chip 701. A second passive jumper 726 interconnects the terminals 1, 2, 12 and 13 of the second covert chip 702. A third passive jumper 736 interconnects the terminals 1, 2, 12 and 13 of the third covert chip 703.

It may be noted that the preferred embodiment utilizes NAND chips as the electronic equivalent of inverter/diode circuitry. During the emperical tests leading toward the development of the preferred embodiment it was found that, in cooperation with the other particular components used, the NAND chips provided more stable circuitry than an inverter/diode arrangement. The use of NAND chips with passive and diodic jumpers establishes the equivalent of inverter/diode circuitry but is not deemed restrictive to the invention, merely illustrative.

A negative bus 717 interconnects with the terminals 7 of the first, second and third covert chips 701, 702 and 703 and with the grounding lead 71.

A positive bus 718 interconnects with the collector terminals 712, 722 and 733 of the overt transistors 710, 720 and 730 and with the overt power input lead 72.

The interpretive assembly 70 is provided overt input signals through the first, second and third overt input leads 73, 74 and 75 connecting with the first, second and third emitter terminals 711, 721 and 731 and provided covert input signals through the first, second and third covert input leads 73', 74' and 75' connecting with the first, second and third passive jumpers 716, 726 and 736.

A first output signal is transmitted through a first triple diode 780 having a first lead 781 connecting to terminal 11 of the first covert chip 701, a second lead 782 connecting to terminal 11 of the second covert chip 702, a third lead 783 connecting to terminal 11 of the third covert chip 703 and a fourth lead 784 connecting to the first output terminal 78.

A second output signal is transmitted through a second triple diode 790 having a first lead 791 connecting to terminal 6 of the first covert chip 701, a second lead 792 connecting to terminal 6 of the second covert chip 702, a third lead 793 connecting to terminal 6 of the third covert chip 703 and a fourth lead 794 connecting to the second output terminal 79.

Figure 8:
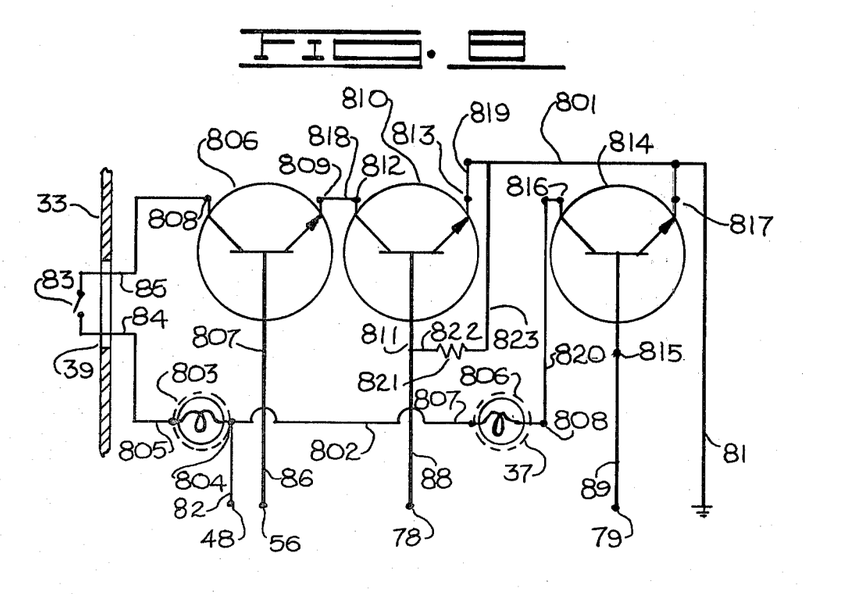
FIG. 8 is a schematic of the means of developing an external display of the results of internal evaluations.

As seen in FIG. 8 the light signal assembly 80 has a negative bus 801 connecting to the ground 81 and a positive bus 802 connecting to the input power lead 82.

A first light 803 has a power input lead 804 connecting with the positive bus 802 and a power output terminal 805.

A second light 803' has a power input lead 804' connecting with the positive bus 802 and a power output terminal 805'.

The light control switch 83 has an input lead 84 connecting with the first power output terminal 805 and a switch output lead 85.

A first light control transistor 806 has a base terminal 807, a collector terminal 808 and an emitter terminal 809. A second light control transistor has a base terminal 81, a collector terminal 812 and an emitter terminal 813. A third light control transistor 814 has a base terminal 815, a collector terminal 816 and an emitter terminal 817.

The first transistor base terminal 807 connects with the confirmation input lead 86, the collector terminal 808 connects with the light control switch output lead 85 and the emitter terminal 809 connects with a first transistor jumper lead 818.

The second transistor base terminal 811 connects with the first light signal power input lead 86, the collector terminal 812 connects with the first transistor jumper lead 818 and the emitter terminal 813 connects with a second transistor jumper lead 919 that connects with the negative bus 801.

The third transistor base terminal 815 connects with the second light signal power input lead 89, the collector terminal 816 connects with a third transistor jumper lead 820 which connects with the second light power out terminal 805'.

A bleed resistor 821 has a first lead 822 connecting with the second transistor base terminal 811 and a second lead 823 connecting to the negative bus 801.

In FIG. 8 phantom lines indicate the relative position of the first indicator window 36 with the first light 803 and the second indicator window 37 with the second light 803'.

The full function of the encoded card 20, the decoder box 30, the power supply assembly 40, the encodement sensor assembly 50, the response sensor assembly 60, the interpretive assembly 70, the light signal assembly 80 and the modified Colpitts Oscillator circuits 90 is to develop a visual light indication in either the first indicator window 36 or the second indicator window 37. It is believed that the details set forth heretofore properly and adequately set forth the operational sequence of the teaching tool 10.

What is claimed is:

1. An rf switching apparatus for the production of digital logic electronic HIGH and LOW signals characterized as comprising:

means for containing at least one rf switching apparatus within a box that is at least in part transparent to radio waves so as to form at least one rf window and wherein conventional digital logic electronic chips and discrete components may be positioned internally so as to be protected from the external environment;

means for providing electrical power with a positive bus terminal and a negative bus terminal suitable for the operation of digital logic electronic chips and discrete components within the containment box;

means for mounting as oscillator transistor having a base terminal, a collector terminal and an emitter terminal within the containment box;

means for mounting a switching transistor having a base terminal, a collector terminal and an emitter terminal within the containment box;

means for wiring a load inductor coil between the positive bus terminal and the oscillator transistor collector terminal in a manner providing spatial association between the load inductor coil and an rf window;

means for wiring a variable resistor between the negative bus terminal and the oscillator transistor emitter terminal;

means for wiring a coupling capacitor with a first lead to the oscillator transistor collector terminal and forming a diode node with the coupling capacitor second lead;

means for wiring a first rectifier diode between the negative bus terminal and the diode node;

means for wiring a first biasing resistor and a first biasing capacitor in parallel between the negative bus terminal and the oscillator transistor base terminal;

means for wiring a second biasing resistor and a second biasing capacitor in parallel between the positive bus terminal and the oscillator transistor base terminal;

means for wiring a time constant capacitor and a time constant resistor in parallel between the negative bus terminal and the switching transistor base terminal;

means for wiring the switching transistor emitter terminal to the negative bus;

means for wiring a second rectifier diode between the diode node and the switching transistor base terminal;

means for wiring a load resistor between the positive bus and the switching transistor collector lead;

means for wiring a digital logic signal lead to the switching transistor collector terminal; and means for placing a substance for absorbing radio frequency energy in external spatial association with the rf window and the internal load inductor coil so as to absorbingly deny feedback energy to the oscillator transistor collector terminal and thus deny the generation of electrical alternating current and thus deny the delivery of electrical direct current to the switching transistor base collector so that positive bus voltage passing through the load resistor can not pass through the switching transistor to the negative bus terminal and therefor builds up as a digital logic electronic HIGH signal on the signal lead and, when the rf absorbing substance is removed from the vicinity of the load inductor coil the feedback produces alternating current which is altered into direct current which activates the switching transistor so that positive bus voltage passing through the load resistor coil can pass through the switching transistor to the negative bus terminal and thus produce a digital logic electronic LOW signal on the signal lead.

2. An rf switching apparatus for the production of visible light signals resulting from the placement of a first rf absorbing substance and a second rf absorbing substance, characterized as comprising:

a card having at least one surface suitable for the display of indicia and formed from a material transparent to radio waves in sufficient part to establish a plurality of rf window areas and having a covertly embedded first rf absorbing substance placed within at least one of such rf window areas;

a decoder box with a removable top, such top formed from a material transparent to radio waves in sufficient part to establish a plurality of rf window areas and having means of guiding so that placement of the card within the guiding means aligns the card rf window areas with the top rf windows, the top also being translucent to light waves in sufficient part to establish a first light window and a second light window and the box interior having provisions for mounting components comprising;

a power supply assembly wherein a plurality of storage batteries may be connected to a voltage regulator to provide a quantity of positive and negative terminals;

an encodement sensor assembly having at least one covert lead wherein a plurality of modified Colpitts Oscillator circuits derive electrical power from the power supply assembly and beam rf energy through the rf windows so that, if the rf energy is absorbed by a first rf absorbing substance, a digital logic HIGH signal is produced on an associated covert output lead and, if the rf window is not shadowed by a first rf absorbing substance, a feedback of rf energy is processed so as to establish a digital logic LOW signal on the associated covert output lead and if any one of the covert output leads achieves a digital logic HIGH signal a confirmation output terminal will also establish a corresponding digital logic HIGH signal on a confirmation output lead;

a response sensor assembly having at least one overt output lead wherein a plurality of modified Colpitts Oscillator circuits derive electrical power from the power supply assembly and beam rf energy through the rf windows so that, if the rf energy is absorbed by a second rf absorbing substance, a digital logic HIGH signal is produced on an associated overt output lead and, if the rf window is not shadowed by a second rf absorbing substance, a feedback of rf energy is processed so as to establish a digital logic LOW signal on the associated overt output lead;

an interpretive assembly wherein a plurality of transistors derive electrical power from the power supply assembly and respond individually to received digital logic HIGH signals from associated overt output leads to power associated digital logic gates arranged to receive covert digital logic signals from associated covert output leads so that any overt powered gate receiving a covert digital logic LOW signal will establish a digital logic HIGH signal on a first light output terminal and any overt powered gate receiving a covert digital logic HIGH signal will establish a digital logic HIGH signal on a second light output terminal and if any of the plurality of first light output terminals achieves a digital logic HIGH signal a corresponding digital logic HIGH signal will be established on a first light signal output lead, and if any of the plurality of second light output terminals achieves a digital logic HIGH signal a corresponding digital logic HIGH signal will be established on a second light signal output lead;

a light signal assembly wherein a first light, a second light, a confirmation transistor, a first light transistor and a second light transistor derive electrical power from the power supply assembly, the confirmation transistor is actuated by a digital logic HIGH signal from the encodement sensor assembly confirmation output lead and the first light transistor is actuated by a digital logic HIGH signal from the interpretive assembly first light signal output lead with the first light, the confirmation transistor and the first light transistor wired in series so that full circuit actuation illuminates the first light and establishes light wave radiations through the first light window of the box top, and wherein the second light transistor is actuated by a digital logic HIGH signal from the interpretive assembly second light signal output lead with the second light wired in series with the second light transistor so that full circuit actuation illuminates the second light and establishes light wave radiations through the second light window of the box top;

a power control switch is connected in series between the power assembly batteries and the voltage regulator so as to allow the operational power to all of the assemblies to be selectively controlled; and a first light control switch that is connected in series between the first light and the confirmation transistor so that power to the first light can be selectively denied even though other conditions call for first light illumination.

3. The apparatus as cited in claim 2 wherein the modified Colpitts Oscillator circuits are further characterized as comprising:

a positive input lead connecting to a positive bus and a negative input lead connecting to a negative bus;

an oscillator transistor having a base terminal, a collector terminal and an emitter terminal;

a switching transistor having a base terminal, a collector terminal and an emitter terminal;

a load inductor coil connecting the positive bus terminal with the oscillator transistor collector terminal and being positioned so that developed rf energy is beamed through an associated rf window in the box top;

a variable resistor connecting the negative bus terminal and the oscillator transistor emitter terminal;

a coupling capacitor with a first lead connecting to the oscillator transistor collector terminal and a second lead forming a diode node;

a first rectifier diode connecting the negative bus terminal and the diode node;

a first biasing resistor and a first biasing capacitor forming a parallel connection between the negative bus terminal and the oscillator transistor base terminal;

a second biasing resistor and a second biasing capacitor forming a parallel connection between the positive bus terminal and the oscillator transitor base terminal;

a time constant capacitor and a time constant resistor forming a parallel connection between the negative bus terminal and the switching transistor base terminal;

a switching jumper lead connecting the switching transistor emitter terminal and the negative bus terminal;

a load resistor connecting the positive bus terminal to the switching transistor collector terminal; and a digital logic signal output lead connecting to the switching transistor collector terminal.

4. The apparatus as cited in claim 3 wherein the interpretive assembly is further characterized as comprising:

a plurality of interpretive transistors, each having a base terminal, a collector terminal and an emitter terminal;

a plurality of two input quad NAND chips, equal in number to the number of interpretive transistors;

a positive bus lead connecting to each of the interpretive transistor collector terminals;

a negative buslead connecting to each of the terminal 7 ground terminals of each of the quad NAND chips;

a plurality of response sensor assembly individual covert output leads, equal in number to the number of interpretive transistors, connecting to the individual interpretive transistor base terminals;

a plurality of overt jumper leads individually connecting the interpretive transistor individual emitter leads to each of the individual terminal 14 power terminals of the quad NAND chips;

a plurality of encodement sensor individual covert output leads, equal in number to the number of NAND chips, connecting to each of the individual terminal 13 input terminals of the quad NAND chips;

a plurality of diodic jumpers individually connecting each of the NAND chip terminals 3, 4 and 5 to each other;

a plurality of passive jumpers individually connecting each of the NAND chip terminals 1, 2, 12 and 13 to each other;

a first multiple diode unit, having individual input leads equal in number to the number of individual NAND chips, has individual input leads connecting to each NAND chip terminal 11 and a first signal light output lead; and a second multiple diode unit, having individual input leads equal in number to the number of individual NAND chips, has individual input leads connecting to each NAND chip terminal 6 and a second signal light output lead.

5. The apparatus as cited in claim 2, 3 or 4 wherein the power supply assembly is further characterized as comprising:

a battery case containing a plurality of batteries and having a negative terminal connecting to the negative terminals of all other assemblies mounted within the containment box and a positive terminal;

a power control switch penetratively mounted in a box sidewall orifice to provide external switch manipulation and, internal to the box, a power input terminal and a power output terminal;

a digital logic electronic voltage regulator having a negative terminal connecting to the battery case negative terminal, an unregulated power input terminal and a regulated power output bus providing output terminals connecting to the positive terminals of all other assemblies mounted within the containment box;

a switch power input lead connecting the positive terminal of the battery case to the power input terminal of the power control switch; and a switch power output lead connecting the power output terminal of the power control switch to the unregulated power input terminal of the voltage regulator.

6. The apparatus as cited in claim 2, 3 or 4 wherein the signal assembly is further characterized as comprising:

a first light mounted within the decoder box in a position permitting the light, when actuated, to be beamed through the first light window in the box top and such light having an input terminal and an output terminal;

a second light mounted within the decoder box in a position permitting the light, when actuated, to be beamed through the second light window in the box top and such light having an input terminal and an output terminal;

a light control switch penetratively mounted in a box sidewall orifice to provide external switch manipulation and, internal to the box, a power input terminal and a power output terminal;

a confirmation transistor having a base terminal, a collector terminal and an emitter terminal;

a first light transistor having a base terminal, a collector terminal and an emitter terminal;

a second light transistor having a base terminal, a collector terminal and an emitter terminal;

a bleed resistor having an input terminal and an output terminal;

means for connecting the first light output terminal to the light control switch input terminal;

means for connecting the light control switch output terminal to the confirmation transistor collector terminal;

means for connecting the first light input terminal and the second light input terminal in parallel to the power assembly positive bus;

means for connecting the confirmation transistor emitter terminal to the first light transistor collector terminal;

means for connecting the second light output terminal to the second light transistor collector terminal;

means for connecting the bleed resistor between the first light transistor base terminal and emitter terminal;

means for connecting the emitter terminals of the first and second light transistors in parallel to the power assembly negative bus;

means for connecting the first light transistor base terminal to the interpretive assembly first light output terminal;

means for connecting the second light transistor base terminal to the interpretive assembly second light output terminal; and means for connecting the confirmation transistor base terminal to the response assembly confirmation output terminal.

* * * * *

UNITED STATES PATENT AND TRADEMARK OFFICE
CERTIFICATE OF CORRECTION

PATENT NO. : 4,425,096
DATED : January 10, 1984
INVENTOR(S) : William O. Schwake It is certified that error appears in the above-identified patent and that said Letters Patent is hereby corrected as shown below:

In Column 1, line 21, the word "asummed" should read --assumed--; in Column 8, line 58, the numeral "81" should read --811--.

Signed and Sealed this

Ninth Day of October 1984

[SEAL]

Attest:

GERALD J. MOSSINGHOFF

Attesting Officer

Commissioner of Patents and Trademarks